(12) United States Patent
Chen

(10) Patent No.: US 9,766,410 B1
(45) Date of Patent: Sep. 19, 2017

(54) WAFER-LEVEL TESTING OF PHOTONIC INTEGRATED CIRCUITS WITH OPTICAL IOS

(71) Applicant: Acacia Communications, Inc., Maynard, MA (US)

(72) Inventor: Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/795,961

(22) Filed: Jul. 10, 2015

Related U.S. Application Data

(60) Provisional application No. 62/023,493, filed on Jul. 11, 2014.

(51) Int. Cl.
| | | |
|---|---|---|
| *G02B 6/30* | (2006.01) | |
| *G02B 6/26* | (2006.01) | |
| *G02B 6/34* | (2006.01) | |
| *G02B 6/35* | (2006.01) | |
| *G02B 6/12* | (2006.01) | |
| *G02B 6/28* | (2006.01) | |

(Continued)

(52) U.S. Cl.
CPC ....... *G02B 6/3596* (2013.01); *G02B 6/12002* (2013.01); *G02B 6/12004* (2013.01); *G02B 6/124* (2013.01); *G02B 6/2852* (2013.01); *G02B 6/30* (2013.01); *G02B 6/34* (2013.01); *G02B 6/42* (2013.01); *G02B 2006/12159* (2013.01)

(58) Field of Classification Search
CPC ..... G02F 1/225; G02F 1/2257; G02B 6/2852; G02B 6/3596; G02B 6/12; G02B 6/12002; G02B 6/12004; G02B 6/42; G02B 6/305; G02B 6/30; G02B 6/34; G02B 6/1225; G02B 6/1228; G02B 6/124; G02B 2006/12104; G02B 2006/12159
USPC ............... 385/14, 16–24, 31–32, 37, 49–52, 385/129–132, 88, 93
See application file for complete search history.

(56) References Cited

U.S. PATENT DOCUMENTS

| | | | |
|---|---|---|---|
| 8,442,368 B1 | 5/2013 | Reano et al. | |
| 2002/0040983 A1* | 4/2002 | Fitzergald | G02B 6/12 257/183 |

(Continued)

FOREIGN PATENT DOCUMENTS

WO   WO 2012/049273 A1   4/2012

OTHER PUBLICATIONS

[No Author Listed], Light on Board™ Optically Enabled BGA IC Package. Reflex Photonics. White Paper. 15 pages.

(Continued)

*Primary Examiner* — Akm Enayet Ullah
*Assistant Examiner* — Michael Mooney
(74) *Attorney, Agent, or Firm* — Wolf, Greenfield & Sacks, P.C.

(57) ABSTRACT

Techniques for forming a photonic integrated circuit having a facet coupler and a surface coupler are described. The photonic integrated circuit may be on a wafer, which may be diced to form an integrated device. The facet coupler may be positioned proximate to an edge of the integrated device, and the surface coupler may be positioned on a surface of the integrated device. The surface coupler may allow for evaluation and assessment of the circuit's performance, which may facilitate wafer-level testing of the circuit and diagnosis of the circuit before and after packaging.

15 Claims, 3 Drawing Sheets

(51) Int. Cl.
  *G02B 6/42* (2006.01)
  *G02B 6/124* (2006.01)

(56) References Cited

U.S. PATENT DOCUMENTS

| | | |
|---|---|---|
| 2012/0207428 A1 | 8/2012 | Roelkens et al. |
| 2012/0250007 A1 | 10/2012 | Na et al. |
| 2013/0209112 A1 | 8/2013 | Witzens |
| 2013/0308898 A1 | 11/2013 | Doerr et al. |
| 2014/0147079 A1 | 5/2014 | Doerr et al. |
| 2014/0153601 A1 | 6/2014 | Doerr et al. |
| 2015/0063747 A1 | 3/2015 | Chen et al. |
| 2015/0117808 A1* | 4/2015 | Chen ..................... G02B 6/30 385/2 |

OTHER PUBLICATIONS

Barwicz et al., Assembly of Mechanically Compliant Interfaces between Optical Fibers and Nanophotonic Chips. The 64$^{th}$ Electronic Components and Technology Conference (ECIC 2014). Orlando, Florida. Presentation. May 27-30, 2014. 14 pages.

Maj et al., Light on Board Technology Overview™: Implementation of High-Speed Optical Interconnects Integrated into Semiconductor Integrated Circuit (IC) Packages. Reflex Photonics, Inc. White Paper. Apr. 2006 4 pages.

* cited by examiner

US 9,766,410 B1

WAFER-LEVEL TESTING OF PHOTONIC INTEGRATED CIRCUITS WITH OPTICAL IOS

RELATED APPLICATIONS

The present application claims the benefit under 35 U.S.C. §119(e) of U.S. Provisional Patent Application Ser. No. 62/023,493 entitled "WAFER-LEVEL TESTING OF PHOTONIC INTEGRATED CIRCUITS WITH OPTICAL IOs," filed Jul. 11, 2014, which is incorporated herein by reference in its entirety.

BACKGROUND

Field

The present application relates to a photonic integrated circuits and related apparatus and methods.

Related Art

A photonic integrated circuit (PIC) includes integrated optical components on a substrate. The PIC may couple to an external optical component through an optical coupler. An optical coupler may be in the form of a facet coupler or a surface coupler. A facet coupler couples to an external optical component via an edge of the substrate. A surface coupler couples to an external optical component via a surface of the substrate.

BRIEF SUMMARY

According to an aspect of the present application an integrated device is provided. The integrated device comprises a photonic integrated circuit within a plane of the integrated device, at least one facet coupler positioned on an edge of the integrated device and configured to couple light between the photonic integrated circuit and a first external optical component positioned proximate to the edge within the plane, and at least one surface coupler positioned on a surface of the integrated device and configured to couple light between the photonic integrated circuit and a second external optical component positioned proximate to the surface in a direction substantially perpendicular to the plane.

According to another aspect of the present application a wafer is provided. The wafer comprises a first region of the wafer having a first photonic integrated circuit coupled to a first surface coupler and a first facet coupler. The wafer further comprises a second region of the wafer having a second photonic integrated circuit coupled to a second surface coupler and a second facet coupler.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
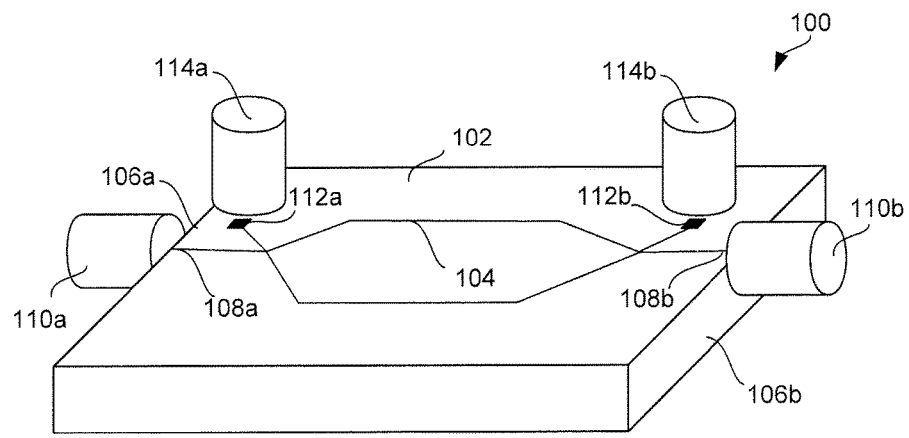
FIG. 1 is an example of an integrated device with a facet coupler and a surface coupler, according to a non-limiting embodiment of the present application.

Aspects of the present application relate to an integrated device with a photonic integrated circuit having at least one facet coupler and at least one surface coupler as optical inputs or outputs to the circuit. A facet coupler and a surface coupler may both couple to the same circuit component of the photonic integrated circuit, and in some embodiments, may couple to either an input side or an output side of a circuit component. A surface coupler may also couple to a circuit component that is inaccessible to a facet coupler, such as a component located away from the edges of the integrated device. The photonic integrated circuit may be part of a wafer and/or an individual integrated device.

Applicants have appreciated the benefits of facet couplers for PICs, including low insertion loss and small polarization dependence over a large optical bandwidth. Applicants have also appreciated the benefits of surface couplers for PICs, mainly more convenient fabrication and production process through wafer-level testing of many circuits. Including both facet and surface couplers as inputs or outputs (I/Os) to circuit components of a photonic integrated circuit may facilitate assessment and evaluation of integrated devices, such as during fabrication or testing of the integrated devices, while preserving the performance benefits of facet couplers. Production of an integrated device may include fabricating multiple integrated devices in a wafer and dicing the wafer to obtain the individual integrated devices or chips. Testing functionalities of the integrated devices while in wafer form may facilitate evaluation of the devices and ease fabrication by identifying devices with proper functioning prior to dicing the wafer and packaging the resulting die. To allow wafer-level testing of integrated devices, the design of the devices may include one or more optical couplers accessible while the device is in wafer form. While a surface of an integrated device may be accessible when the device is still part of a wafer, the edges or facets of the integrated device may not be physically accessible until after the wafer is diced. Therefore, according to aspects of the present application, an integrated device may include one or more surface couplers to facilitate testing of the device while in wafer form. Optical testing performed on a wafer may include screening out non-functioning devices and analyzing statistics of multiple devices before expending the time and costs associated with dicing and packaging the individual integrated devices on the wafer. During the packaging and operation of the device, facet couplers can be used as the optical I/Os as a result of their performance benefits. By including both surface couplers and facet couplers on the same device, both wafer-level testing and desirable operation can be achieved.

Aspects of the present application relate to providing one or more surface couplers that are coupled to components of a photonic integrated circuit to provide access to one or more optical inputs or outputs for testing of the photonic integrated circuit and/or a subcomponent of the circuit when in a wafer form. Some aspects of the present application include a facet coupler and a surface coupler, which may be coupled to the same circuit component (e.g., splitter, combiner, switch) of a photonic integrated circuit. In some embodiments, a facet coupler and a surface coupler are both coupled as either inputs or outputs of the circuit component. In some embodiments, a facet coupler may exist when a photonic integrated circuit is still part of a wafer, even though it may not be accessible at that time. Still, the facet coupler may be formed such that when the wafer is diced into individual integrated devices, the facet coupler may be used as an input or an output of the circuit. Additionally, a surface coupler may be coupled to a subcomponent of the circuit as an input or an output to allow for testing of the subcomponent, which may not be achievable using facet couplers alone.

The aspects and embodiments described above, as well as additional aspects and embodiments, are described further below. These aspects and/or embodiments may be used individually, all together, or in any combination of two or more, as the application is not limited in this respect.

An optical input or output of a photonic integrated circuit may include at least one facet coupler and at least one surface coupler. An exemplary integrated device 100 is shown in FIG. 1 having surface 102 and edges 106a and 106b. Photonic integrated circuit 104 formed within one or more planes of the device 100 may include components located on surface 102 and/or substantially parallel to surface 102. In this manner, surface 102 may be considered a device surface that defines a plane or an orientation of circuit 104. In some embodiments, an edge may be substantially perpendicular to a plane and/or a surface of an integrated device.

Device 100 has optical couplers that provide one or more optical inputs or outputs to other components that are part of circuit 104. Facet couplers 108a, 108b positioned proximate to edges 106a, 106b, respectively, are structured as part of integrated device 100 and configured to direct light into or out of the respective edges 106a, 106b. For example, facet coupler 108a may couple light between photonic integrated circuit 104 and external optical component 110a, such as an optical fiber, positioned proximate to edge 106a of the device. External optical component 110a may direct an optical beam in a direction substantially within a plane of photonic integrated circuit 104 when positioned to couple with facet coupler 108a. A facet coupler may have structures that provide coupling to an external optical component, such as waveguide tapering, although other suitable structures may provide facet coupling capabilities. A photonic integrated circuit may operate using facet couplers as primary inputs and outputs, meaning that the facet couplers may serve as the I/Os during normal operation of the device. For example, circuit 104 may operate with facet coupler 110a as a primary input, while facet coupler 110b may serve as a primary output. Facet couplers may provide benefits during operation of device 100 such as low insertion loss, low polarization dependence, and large optical bandwidth.

Device 100 also includes surface couplers 112a, 112b, which are configured to direct light into or out of surface 102. Surface couplers 112a, 112b may direct light substantially perpendicular to surface 102 and/or a plane in which components of circuit 104 are disposed. The exemplary circuit 104 shown in FIG. 1 is a Mach-Zehnder interferometer (MZI), although it should be appreciated that techniques discussed herein are applicable to other circuit configurations and types. In some embodiments, surface couplers 112a, 112b may direct light at an angle to surface 102 and/or a plane of circuit 104. External optical components 114a, 114b positioned proximate to surface 102 may couple to circuit 104 through surface couplers 112a, 112b. Examples of surface coupler structures include waveguide grating couplers and slanted turning mirrors, although any suitable structure configured as an optical input or output by coupling light between an external optical component (e.g., optical fiber) positioned proximate to surface 102 and circuit 104 may be used. A photonic integrated circuit may operate using surface couplers as auxiliary inputs and outputs rather than primary I/Os, in some embodiments. For example, circuit 104 may operate with surface coupler 114a as an auxiliary input, while surface coupler 114b serves as an auxiliary output.

A facet coupler and a surface coupler may couple to a circuit component as an input and/or an output of the circuit component. The facet coupler and the surface coupler may both couple to either an input side or an output side of the circuit component. In this manner, the facet coupler and the surface coupler are located on the same side of the circuit component. As shown in FIG. 1, facet coupler 108a and surface coupler 112a are located on the same side of circuit 104, and facet coupler 108b and surface coupler 112b are located on another side of circuit 104. Facet couplers 110a and 110b may serve as an input or an output during normal operation of the device (e.g., after the device has been packaged), while surface couplers 112a and 112b may serve as an input or output during testing and characterization of the device. The testing and characterization may occur while the device is part of a wafer where surface couplers 112a and 112b are accessible and facet couplers 108a and 108b may not be accessible.

Figure 2:
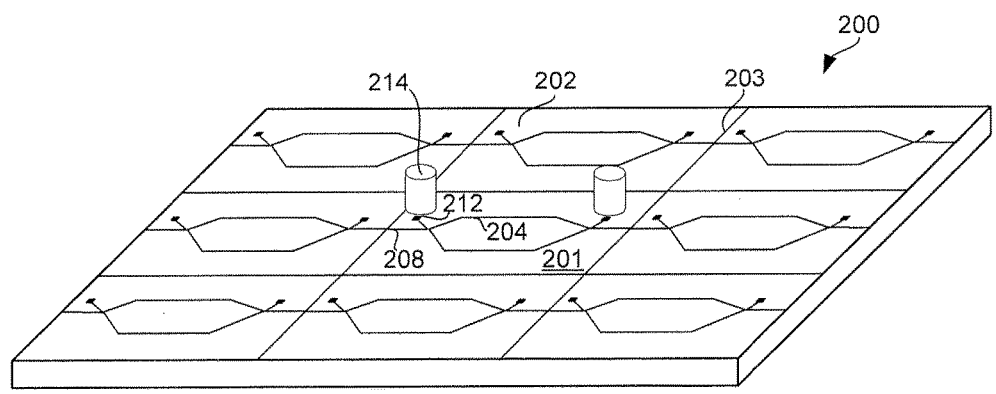
FIG. 2 is an example of a wafer with PICs having a facet coupler and a surface coupler, according to a non-limiting embodiment of the present application.

A wafer may include multiple regions, where a region has a photonic integrated circuit coupled to a surface coupler and a facet coupler. An exemplary wafer 200 having regions with photonic integrated circuits is shown in FIG. 2. Dicing of wafer 200 along the gridlines 203 may form individual integrated devices from the different regions, such as an integrated device from region 201 similar to the integrated device shown in FIG. 1. Region 201 of wafer 200 includes photonic integrated circuit 204 coupled to facet coupler 208 and surface coupler 212. Although the edges of region 201 are formed after dicing of wafer 200, region 201 includes the structure of facet coupler 208 proximate to an edge of region 201. Surface 202 of wafer 200 is accessible, and surface coupler 212 of region 201 may couple external optical component 214 positioned at surface 202 to circuit 204. In this manner, surface coupler 212 provides an optical input or an optical output to circuit 204 while wafer 200 remains intact, and allows for wafer-level testing and characterization of circuit 204.

Design of photonic integrated circuits to include both a surface coupler and a facet coupler can be achieved by configuring components within the circuit to include an additional input or output and/or adding a component to the circuit to provide an additional input or output. Configuration of circuit components that are part of an existing circuit design to include an additional input or output may provide benefits by reducing the complexity of the circuit. Adapting a circuit component to include an additional input or output may facilitate the fabrication process and associated costs of devices having the circuit. Rather than adding a separate component to the circuit, which may increase loss and reduce efficiency of the circuit, configuration of a circuit component to include an additional input or output may balance loss associated with introducing this additional structure with the benefits of the capability of testing the circuit at a wafer-level. In some instances when, due to its nature, a circuit component cannot be designed to include an additional input or output, one or more additional components may be added to the circuit to allow provision of additional inputs/outputs. Examples of circuit components and structures to implement the addition of an input or output are provided below, although other suitable components and structures may be used according to the techniques described herein. The circuit component or structure may include an optical input or output configured as a facet coupler in addition to an optical input or output coupled to a surface coupler. In some embodiments, the circuit component or structure may have an optical input or output coupled to a surface coupler, but lack an optical input or output capable of facet coupling.

Figure 3:
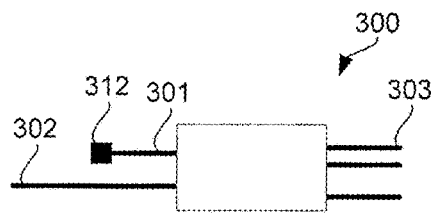
FIG. 3 is an example of an M×N coupler having an input or an output coupled to a surface coupler, according to a non-limiting embodiment of the present application.

Some embodiments of the present application relate to an M×N coupler part of a photonic integrated circuit having an input or an output (I/O) coupled to a surface coupler. The M×N coupler may be a splitter or a combiner structure having M optical I/Os on one side and N optical I/Os on the other side. An example M×N coupler having a 2×3 coupler structure is shown in FIG. 3. M×N coupler 300 includes on the M-side optical I/O 301 coupled to surface coupler 312. In some instances, the M-side may function as an input side of M×N coupler 300 such that surface coupler 312 may provide an optical input, while in other embodiments, the N-side having optical I/O 303 may function as an input side and optical I/O 301 coupled to surface coupler 312 may function as an optical output. In some embodiments, optical I/O 302 may couple to a facet coupler, and both surface coupler 312 and the facet coupler are coupled to the M-side of the M×N coupler, which may be either the input side or the output side depending on the operation of the M×N coupler. In such embodiments, optical I/O 302 may extend to an edge of a wafer region and/or integrated device to provide facet coupling capabilities to an external optical component positioned proximate to the edge. In some embodiments, the M×N coupler may lack an optical I/O with the capability of facet coupling, and surface coupler 312 may provide an optical I/O suitable for testing one or more subcomponents of the photonic integrated circuit.

During the design and fabrication of a photonic integrated circuit, an M×N coupler can be adapted to include an additional optical I/O by adding an optical I/O to the input side and/or the output side of the M×N coupler such that an M×N coupler becomes a M+1×N coupler or an M×N+1 coupler, or an M+1×N+1 coupler. In this manner, alteration of an existing design for a photonic integrated circuit can be reduced while still achieving an additional optical I/O to couple with a surface coupler to provide wafer-level testing capabilities. For example, a 1×N splitter (or combiner) can be replaced with a 2×N splitter (or combiner) within a photonic integrated circuit where the additional port is used as an optical I/O coupled to a surface coupler. Such a technique is illustrated with respect to FIGS. 1 and 2, where circuits 104 and 204 include 2×2 couplers having optical I/Os coupled to surface couplers 114a, 114b and 214, respectively.

Figure 4:
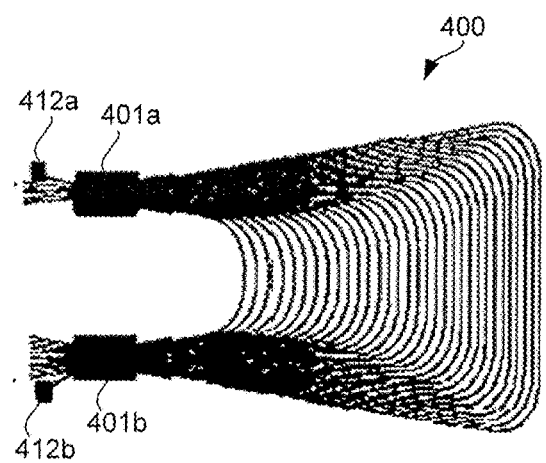
FIG. 4 is an example of an arrayed waveguide grating having an input and an output coupled to a surface coupler, according to a non-limiting embodiment of the present application.

Another example of an M×N coupler is illustrated in an arrayed-waveguide grating. An arrayed-waveguide grating, such as shown in FIG. 4, may be used for wavelength multiplexing and demultiplexing. Arrayed-waveguide grating 400 includes an (auxiliary) optical I/O coupled to surface coupler 412a near the first star coupler 401a and another (auxiliary) optical I/O coupled to surface coupler 412b near the second star coupler 401b. The optical I/Os coupled to surface couplers 412a and 412b may be formed in parallel with other (primary) optical I/Os. In this manner, a photonic integrated circuit having an arrayed-waveguide grating can be configured to include an optical I/O coupled to a surface coupler for wafer-level testing of the circuit and/or of the arrayed-waveguide grating subcomponent of the circuit. In some embodiments, one or more optical I/Os of an arrayed-waveguide grating may have, in addition to the optical I/O coupled to the surface coupler, a facet coupler configuration for some of the (primary) optical I/Os, which may be used during packaging and operation of a device with the arrayed-waveguide grating.

Other aspects of the present application relate to circuit components that may be added to a photonic integrated circuit design to provide an optical I/O coupled to a surface coupler. In some instances, the circuit may not include components which can be configured with ease to include an additional optical I/O at a certain location of the circuit. Accordingly, a component, such as an optical switch or tap coupler, may be included in the circuit design to add an optical I/O coupled to a surface coupler near another optical circuit component.

Figure 5:
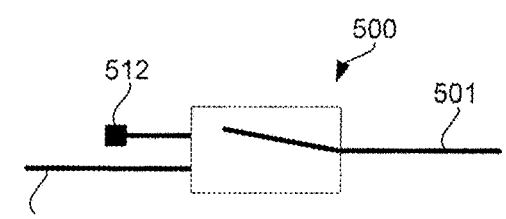
FIG. 5 is an example of an optical switch having an input or an output coupled to a surface coupler, according to a non-limiting embodiment of the present application.

Some embodiments relate to a photonic integrated circuit having a surface coupler coupled to an input or an output of an optical switch. An example of an optical switch is shown in FIG. 5. Although optical switch 500 is configured as a 2×1 optical switch, an optical switch according to the techniques of the present application may have any suitable number of inputs and outputs. The configuration of optical switch 500 may allow for different states which select and/or deselect coupling between one or more inputs and one or more outputs of optical switch 500. Configuring an optical switch to operate in any given state may occur by selecting a certain state through a control signal, allowing control of the optical switch state by an operator. One state of an optical switch may connect an optical I/O coupled to surface coupler 512 to an optical I/O connected to the photonic integrated circuit, such as optical I/O 501 shown in FIG. 5. In this manner, optical switch 500 may operate in a state where surface coupler 512 is connected to a circuit and functions as an optical input or output. Optical switch 500 may also have a state where the coupling of surface coupler 512 to another input or output of the optical switch is reduced or removed. In this state, optical switch 500 may operate to disconnect surface coupler 512 from a circuit. In some embodiments, an I/O of optical switch 500 may couple to a facet coupler. For example, I/O 502 may extend to an edge of an integrated device or region of a wafer and may include additional structures to form a facet coupler. In such embodiments, a state of optical switch 500 may connect the facet coupler to a circuit by connecting I/O 502 to the circuit. Including an optical switch with an I/O coupled to a surface coupler may have a design where the insertion loss arising from including this additional component may be reduced to less than 0.6 dB, less than 0.4 dB, or less than 0.2 dB.

An optical switch configured to have a state where a surface coupler is coupled to a circuit may provide wafer-level testing capabilities of the circuit. During characterization of photonic integrated circuits on a wafer, the optical switch may be configured to connect the surface coupler by a control signal. The surface coupler may be disconnected from a circuit during operation of the circuit as an integrated device when the operation of the integrated device may occur using one or more facet couplers. In some embodiments, an optical switch may have a default state, connecting an optical I/O other than an I/O coupled to a surface coupler. The optical switch may be designed to have a primary optical I/O connected as a default state. To assess and test a circuit at a wafer-level, a control signal may configure the optical switch to connect an optical I/O coupled to a surface coupler to allow operation of the circuit through the surface coupler. The optical switch may be reset to the default state where the surface coupler is disconnected. After dicing of the wafer into individual integrated devices, one or more facet couplers are accessible and used as optical I/Os. By designing an optical switch to exhibit a default state corresponding to the desired state of the switch during normal operation, management of the optical switch is reduced to periods of testing.

Figure 6:
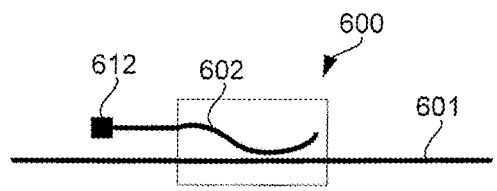
FIG. 6 is an example of a tap coupler coupled to a surface coupler, according to a non-limiting embodiment of the present application.

Another embodiment relates to a photonic integrated circuit having a surface coupler coupled to an optical input or output of a tap coupler. An example of a tap coupler is shown in FIG. 6. Tap coupler 600 may include waveguide 602 configured to couple light with another waveguide 601, such as a waveguide that is part of a photonic integrated circuit. Surface coupler 612 coupled to waveguide 602 may act as an optical input or output depending on the direction of light coupling between waveguides 601 and 602. In some embodiments, tap coupler 600 acts as a passive tap coupler, and waveguide 602 has a configuration that directs a portion of light traveling through waveguide 601 to surface coupler 612 as an optical output. The design of tap coupler 600 may have a configuration in which a majority of light is directed through waveguide 601, which is coupled to a circuit optical path. In some embodiments, an end of waveguide 601 may have a facet coupler (not shown) which may serve as an optical input or output to a circuit coupled to waveguide 601. Insertion loss in the optical response of the circuit due to including a tap coupler as part of the circuit can be calibrated to accurately characterize the circuit's performance. The optical response of waveguide 601 may have an insertion loss based on the tap ratio of the tap coupler. Additionally, the optical response of waveguide 602 may have an insertion loss due to the relatively small amount of light coupled to or from waveguide 602. To correct for these types of losses and optical responses, a circuit having a tap coupler may be assessed and evaluated to calibrate the circuit's response.

Placement of surface couplers at respective inputs and outputs of a photonic integrated circuit, including inputs or outputs of subcomponents of the circuit, may allow for testing and assessment of the circuit as well as individual subcomponents. Unlike facet couplers, which are configured proximate to the edges of an integrated device, surface couplers may be placed throughout the integrated device and provide additional flexibility in the parts and components of a circuit that can be tested. By coupling a surface coupler to an input and an output of a circuit subcomponent, the performance of the subcomponent can be diagnosed, which may aid in characterizing both the performance of an individual device and uniformity among different devices. Additionally, coupling an input or an output of a circuit subcomponent to a surface coupler may allow for debugging of an integrated device with unexpected performance by testing the subcomponent rather than only relying on the results provided by the input and the output to the larger circuit.

Figure 7:
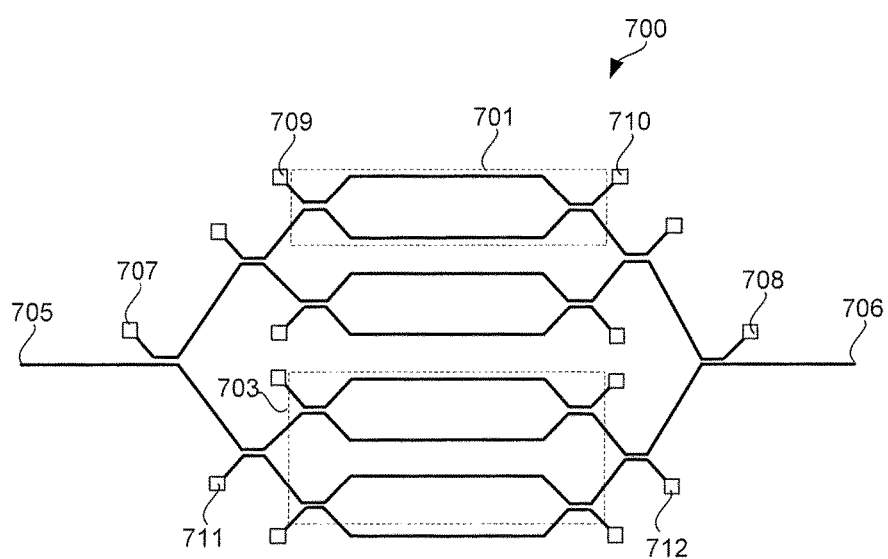
FIG. 7 is an example of a PIC having multiple inputs/outputs (I/Os), according to a non-limiting embodiment of the present application.

FIG. 7 illustrates an example of a photonic integrated circuit 700 having nested Mach-Zehnder interferometers, which may be used for coherent communications applications. Circuit 700 has optical I/Os 705 and 706, which may serve as primary optical I/Os. By configuring splitters and combiners to have a 2×2 coupler design, additional optical I/Os coupled to surface couplers are included in circuit 700 in a manner that reduces the interference of these additional I/Os with operation of optical I/Os 705 and 706. For example, interference may be reduced by designing the additional optical I/Os to reduce reflections. In the example shown in FIG. 7, fourteen surface couplers are included. Surface coupler 707 is coupled to a 2×2 coupler on the same input or output side of the circuit 700 as optical I/O 705, while surface coupler 708 is coupled to the same side of a 2×2 coupler as optical I/O 706. With such a configuration surface couplers 707 and 708 may allow for wafer-level testing of circuit 700. For testing of circuit subcomponents, surface couplers 709 and 710 are coupled to opposite input or output sides of subcomponent 701 in circuit 700, in this case an individual MZI subcomponent. Additionally, surface couplers 711 and 712 coupled to opposite input and output sides of subcomponent 703 including a pair of MZIs and may allow for testing and diagnosis of subcomponent 703. Such a configuration of surface couplers for testing of subcomponents may provide assessment for uniformity of subcomponents within the same circuit and/or across multiple circuits within a wafer. Although fourteen surface couplers are shown in FIG. 7, the techniques described herein relating to including a surface coupler in a photonic integrated circuit may be implemented with any suitable number of surface couplers. For a certain circuit, the number of surface couplers may depend on the circuit design, including the number and types of components included in the circuit.

Another feature of implementing surface couplers on a circuit includes arranging the locations of the surface couplers in a manner that allows for convenient and streamlined testing of the circuit, such as through wafer-level testing. For example, one or more surface couplers may be arranged in a row or column to allow a fiber assembly designed to couple to all surface couplers simultaneously, facilitating the testing procedure by shortening the time required for making the connections needed for the testing. In this manner, many circuits on a wafer can be streamlined by aligning the fiber assembly to each circuit and obtaining results from the surface couplers coupled to one or more inputs or outputs of the circuit.

It should be appreciated from the foregoing that an aspect of the present application provides a method for using both facet couplers and surface couplers with a photonic integrated circuit. The photonic integrated circuit may be fabricated to include at least one surface coupler and at least one facet coupler. While the photonic integrated circuit is still part of a wafer, the surface coupler may be used to test the photonic integrated circuit or a subcomponent thereof. After testing is complete, the wafer may be diced and packaged. Thereafter, the at least one facet coupler may be used during normal operation of the photonic integrated circuit.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. An integrated device comprising:
   a photonic integrated circuit including a M×N coupler within a plane of the integrated device;
   at least one facet coupler positioned on an edge of the integrated device and configured to couple light between the photonic integrated circuit and a first external optical component positioned proximate to the edge within the plane; and
   at least one surface coupler positioned on a surface of the integrated device and configured to couple light between the photonic integrated circuit and a second external optical component positioned proximate to the surface in a direction substantially perpendicular to the plane, wherein the at least one surface coupler includes a first surface coupler coupled to an input or an output of the M×N coupler.

2. The integrated device of claim 1, wherein the at least one surface coupler includes a second surface coupler, and the photonic integrated circuit includes a circuit component to which the at least one facet coupler and the second surface coupler are coupled.

3. The integrated device of claim 1, wherein the at least one surface coupler includes two second surface couplers, and the photonic integrated circuit includes a circuit component having a subcomponent coupled to the two second surface couplers.

4. The integrated device of claim 1, wherein the at least one facet coupler includes a first facet coupler coupled to an input or an output of the M×N coupler, and wherein the first facet coupler and the first surface coupler are both coupled to either an input side or an output side of the M×N coupler.

5. The integrated device of claim 1, wherein the M×N coupler includes an optical switch, and the first surface coupler is coupled to an input or an output of the optical switch.

6. The integrated device of claim 5, wherein the at least one facet coupler includes a first facet coupler coupled to an input or an output of the optical switch, wherein the first facet coupler and the first surface coupler are both coupled to either an input side or an output side of the optical switch.

7. The integrated device of claim 6, wherein the optical switch is configured by a control signal to have a first state where the first facet coupler is configured to couple light between the photonic integrated circuit and the first external optical component and a second state where the first surface coupler is configured to couple light between the photonic integrated circuit and the second external optical component.

8. The integrated device of claim 1, wherein the M×N coupler includes a tap coupler, and the first surface coupler is coupled to an input or an output of the tap coupler.

9. The integrated device of claim 8, wherein the at least one facet coupler includes a first facet coupler coupled to an input or an output of a waveguide coupled to the tap coupler.

10. The integrated device of claim 1, wherein the M×N coupler includes a star coupler and the first surface coupler is coupled to an input or an output of the star coupler.

11. The integrated device of claim 10, wherein the at least one facet coupler includes a first facet coupler coupled to an input or an output of the star coupler, wherein the first facet coupler and the first surface coupler are both coupled to either an input side or an output side of the star coupler.

12. The integrated device of claim 10, wherein the photonic integrated circuit includes an arrayed-waveguide grating having the star coupler.

13. The integrated device of claim 1, wherein the M×N coupler has a splitter structure.

14. The integrated device of claim 1, wherein the M×N coupler has a combiner structure.

15. The integrated device of claim 1, wherein the photonic integrated circuit includes at least one Mach-Zehnder interferometer.

* * * * *